April 7, 1953 R. K. POTTER 2,634,413
VELOCITY MEASURING SYSTEM UTILIZING RADIO TECHNIQUE
Filed April 8, 1948

INVENTOR
R. K. POTTER
BY *Guy T. Morris*
ATTORNEY

Patented Apr. 7, 1953

2,634,413

UNITED STATES PATENT OFFICE 2,634,413

VELOCITY MEASURING SYSTEM UTILIZING RADIO TECHNIQUE

Ralph K. Potter, Morristown, N. J., assignor to Bell Telephone Laboratories, Incorporated, New York, N. Y., a corporation of New York Application April 8, 1948, Serial No. 19,748

5 Claims. (Cl. 343—8)

This invention relates to a radio system making use of the Doppler effect for measuring the relative velocities of two relatively moving objects, one carrying radio equipment and the other adapted to reflect the transmitted waves, where, in the interest of both utility and convenience, pulses instead of continuous waves are transmitted and reflected although using a continuous wave to develop the Doppler beat frequency by intermodulation. The Doppler frequency is a measure of the relative velocity.

Since the system, outside of its specific purpose and the utilization of the Doppler effect, is a pulse operated "Radar" system, the invention may be thought of as an adaptation of a pulse radar system, or the elaboration of the same, to achieve, besides the intelligence of a given reflecting object from the object carrying the radio equipment by conventional radar technique, a highly accurate measurement of relative velocity of the two objects.

The object of the invention in its broadest aspect is to measure the velocity of a given object carrying radio equipment, relatively to another, given, object, by radio technique, and, more specifically, by utilization of the Doppler effect.

A related and more specific object is, by application of the Doppler principle in the measurement of relative velocity wherein radio pulses, as distinguished from continuous waves, are used for transmission and subsequent reflection, to achieve the advantages inherent generally in the use of pulses in such an environment (which will be enumerated later) besides the obvious advantage of permitting simultaneously therewith the operation of conventional radar technique for, in one example, object locating. The most important of these advantages is that the use of pulses permits Doppler observations upon individual objects, at will.

The Doppler principle has been applied, without the pulse feature, in a great many instances for velocity or change of position indication and its inherent advantages are many. By conventional radar technique (or, as it is sometimes stated, the technique of differentiating pulse echo delays), or in other analogous methods however denominated, an indirect measure of relative velocity may be obtained. However, the use of the Doppler principle in the elaboration of the radar system as in accordance with this invention, provides a much more precise method of velocity measurement than is possible merely with pulses or wave groups and an otherwise better velocity measuring technique by making possible the direct indication of velocity, that is, without the intermediation of steps for adjusting, calculating and exercising judgment.

The latter advantage, that is, the direct indication of velocity, would be realized whether radio pulses or a continuous wave was used. However, certain specific advantages accrue from the use of the pulses. Among these advantages, each giving rise to a new specific object of the invention, are (1) it obviates the necessity of, to a great extent, isolating the transmitting and receiving antennas from each other to avoid effects analogous to that of cross-talk; (2) the necessary power output is greatly reduced by avoidance of a 100 per cent "duty cycle," this being analogous to the efficiency principle of impulse excitation of amplifiers, for example and, probably most important of all, (3) it permits Doppler observations upon any one object among many.

It has been emphasized above that the utilization of the Doppler principle makes possible a very much quicker determination of relative velocity than by non-Doppler methods. This fact is all the more emphasized when pulses are used, from the fact, as will be brought out in the detailed description, that within the teachings of this invention the relative velocity may actually be measured by the pulse frequency itself, as adjusted to recognize and take account of the Doppler frequency.

When thought of as an elaboration of, or adjunct of, a simple conventional radar system, and in view of the many suggested fields of use of such a radar system, the invention has much prospective utility. For example, within the field of aviation, it should provide much more accurate tracking of one plane by another when the speed or course of the target plane (lead plane) is changing rapidly; also it should make possible more accurate measurement and quicker measurement, of ground speed, using reflections from surface irregularities; and these may be cited as additional objects of the invention.

The principles of the invention will be more readily understood in connection with the following description when taken with the accompanying drawing in which.

Figure 2:
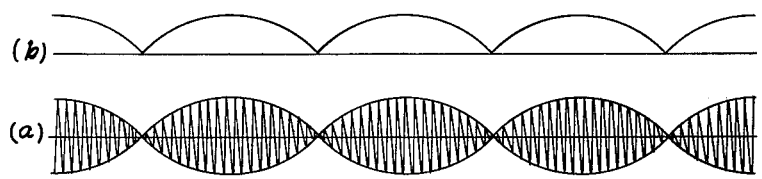
Fig. 2 illustrates certain operational wave forms characteristic of the operation of the Fig. 1 system.
Figure 3:
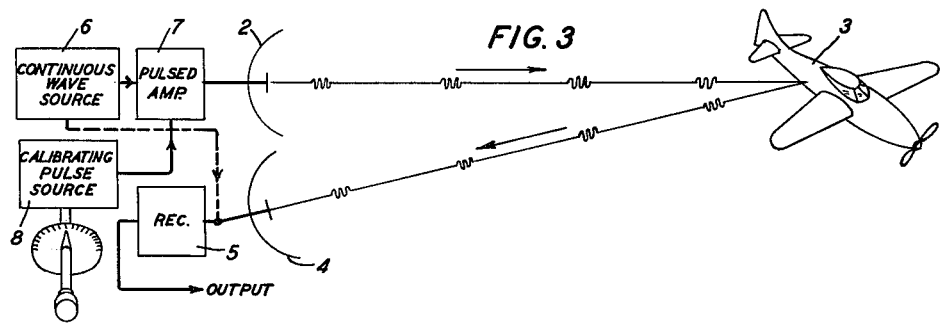
Fig. 3 illustrates a system similar to that of Fig. 1 but illustrating a continuous wave-pulse method or system and therefore a method or system characterizing the invention.
Figure 4:
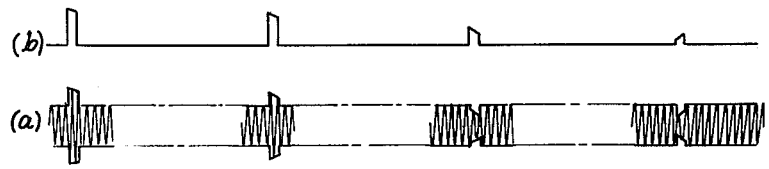
Figure 5:
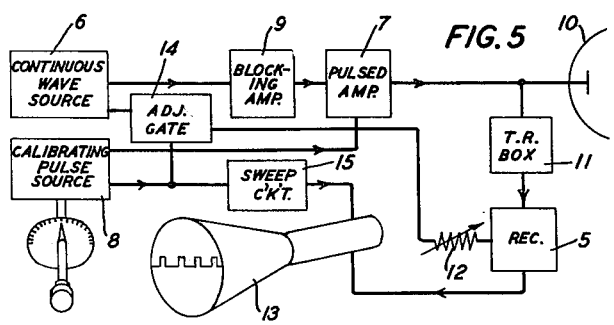

Fig. 4, similarly as Fig. 2, illustrates certain operational wave forms characteristic of the operation of the Fig. 3 system; and Fig. 5 illustrates a system of the invention similar to that of Fig. 3 in ultimate effect but comprising certain modified features in the interest of simplicity and economy of plant.

In the system figures of the drawing the operational units of the system are shown, in almost every instance, by blocks because these units are all old in the art and are made known, for present purposes, merely by a statement of their function. Besides the numerical identifications for the satisfaction of specification writing practice, literal designations will be used inside said blocks, suggestive of the respective functions, or, in some instances, stating said functions in extenso. This is all in the interest not only of simplification of the teaching but also to better bring out the essentially novel features of the invention.

Figure 1:
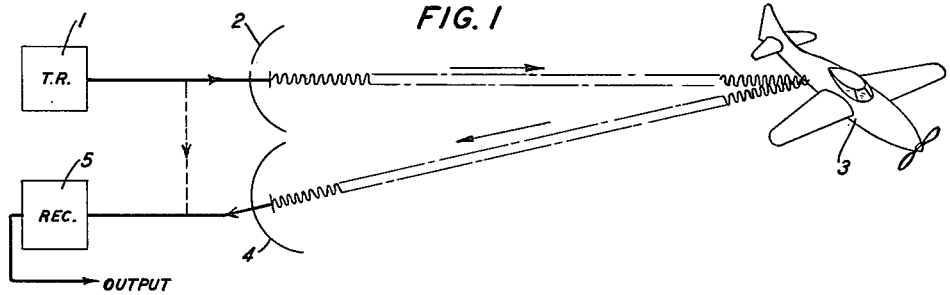
Fig. 1 represents schematically and diagrammatically a continuous wave method or system utilizing the Doppler principle but therefore not embodying the pulse principle which distinguishes the invention, so that the figure may be thought of as representing a phototype system.

In Fig. 1 transmitter 1 sends out from antenna 2 a continuous wave signal, as indicated, to relatively movable target 3 from which it is reflected to be subsequently received by antenna 4 and combined in element 5 with a regulated amount of continuous wave directly transmitted thereto from transmitter 1. The dash line indicates the path of this combining wave. The output of element 5 would accordingly be made up of a combination of the direct wave from transmitter 1 and the reflected wave from the distant relatively movable target. Without changing the operation of the basic principle of the invention the target could comprise a receiver-transmitter so as to reradiate, instead of merely reflect, the incident wave.

Because of the operation of the Doppler principle, and as indicating the Doppler effect, the relative motion causes at the receiver a different frequency than that characteristic of the wave in space. Ordinarily the Doppler effect is thought of as measured at a receiving point distant from the transmitting point, the frequency increasing while the intervening space is decreasing because of the velocity of approach, and decreasing where the intervening space is increasing for analogous reasons. In the present instance the observation is made near the transmitting point and the Doppler effect (that is, the Doppler, or beat, frequency) is doubled because of the reflection. This beat frequency, in other words, is a function of, among other things, the relative velocity of the transmitter-receiver and the target. Specifically the relation may be expressed as follows:

$$F = (\text{approximately}) \frac{55}{\lambda} V$$

where $\lambda$ is in centimeters and $V$ is in kilometers per hour. Where $\lambda=10$ centimeters and $V=480$ kilometers per hour (300 miles per hour) $F=2600$ cycles per second. This demonstrates the practicability of the method in the measurement of relative velocity since the beat frequency which measures the desired quantity is of such value as to easily lend itself to indication. The method could measure beats of a few cycles per second just as easily, and so could determine much lower speeds than is possible by pulses or wave groups without the use of the Doppler principle.

While the physical picture accounting for this effective change of frequency because of the operation of the Doppler principle is well known and is described in a great many places, the following very brief development of the picture may not be inappropriate.

Of course, the change of frequency is only as seen by the relatively moving receiver and is a matter of the interception of wave crests incident thereon (that is, on the relative movable station carrying the circuits of the invention). As long as there is a fixed number of wavelengths between transmitter and receiver the frequency of wave arrival at the receiver is the same as that of wave generation at the transmitter. Anything that alters the number of wavelengths in this path causes the rate of arrival of received waves (or the frequency) to differ from the rate of generation. If there were no relative motion between the receiver and the target the receiver, of course, would intercept the waves at the rate at which they occur in the ether as in ordinary practice. If the waves could be thought of as stationary in the ether for a given small period while the receiver moved to intercept them the receiver would still indicate a frequency as measured directly by its velocity in the direction of the original wave propagation and the receiver, if sentient, would not know whether it were moving or if it were receiving waves at that frequency. In the practical case there is a combination of these two effects, the receiver therefore, by its motion in the line of propagation, intercepting the waves at a different rate than if it were standing still. If moving toward the target it would intercept more of them, if moving away from the target, less of them.

The wave plot (a) of Fig. 2 represents the combination of two waves of equal amplitude and differing very slightly in frequency as connoting a small relative velocity of the observing point past the point observed. This, for instance, would be indicated by a cathode ray oscillograph at the input to the receiver. The envelope of the combination wave is shown in (b) of this Fig. 2 as developed by the demodulation operation of the receiver 5. It reproduces the form of the envelope exhibited in (a). A great variety of conditions are possible, all familiar to the student of modulation, of which perhaps the simplest, but nevertheless a typical, case is shown, in which the component waves are of the same amplitude and the envelope is developed by a simple linear rectification. The transmitter and receiver block circuits 1 and 5 are assumed to contain the conventional circuit means for accomplishing these purposes and, therefore, would probably include besides the rectifier in the receiver, means to adjust the amplitude of the direct received wave at the receiver, and filter means for removing the high frequency components of the rectified wave. It should be understood that the use of any of the variant forms of receiver, either as affecting the particular means for combining the waves, or as affecting the relative amplitudes of the component waves, or any other variant from the particular procedure followed or apparatus here shown, would not change the ultimate result except in degree, and the principle of the invention is adapted impartially to this permissible variety of technique and apparatus.

In Fig. 3 which represents a modification of the system of Fig. 1, in order to teach the system of the invention, a system is shown that differs from that of Fig. 1 only in that for the continuous wave of the Fig. 1 system there is substituted wave pulses. This means that, in place of the transmitter 1 of Fig. 1, there is here used the continuous wave source 6 and the pulsed amplifier 7, the amplifier wave being pulsed by pulser 8. Since the wave to be combined with the reflected pulses is still presumed to be a continuous wave, it is transmitted from the continuous wave source to the receiver. The showing of the continuous wave source and pulsed amplifier rather than merely a pulsed continuous wave source, is in deference to the practical consideration that a conventional pulsed source does not transmit any appreciable continuous wave in addition to the pulses, so that such a source would not be available to supply the combining continuous wave. With the set-up as shown comprising the continuous wave source and a pulsed amplifier this desirable result may be practicably achieved. The pulser of course is merely a source of waves of the desired pulse frequency, which would ordinarily be in, or in the neighborhood of, the audible frequency range. For practical convenience, as will be evident later, it should be of variable frequency and calibrated as to frequency. The continuous wave source would be adapted to generate waves of any desirable frequency although in practice they would have an ultra-high frequency, as in the example given. The pulsing of the amplifier, which element itself is conventional in the art of ultra-high frequency amplification, may be accomplished in various well-known ways, as by operating on the supply circuit of the amplifier.

In the operation of the Fig. 3 system radio pulses only, as indicated, are transmitted to, and reflected from, the target. They are beat with the continuous wave provided at the input of the receiver exactly as in the instance of the Fig. 1 system. The important difference is that since only pulses are transmitted, the beat frequency wave also consists of pulses only, that vary in amplitude as the target moves relatively and in proportion to this movement. For a given amount of continuous wave signal sent across from the continuous wave source to the receiver, the pulses and continuous wave together would have the appearance shown in (a) of Fig. 4. The conformation at the two points where the pulse amplitude is less than that of the continuous wave results from the fact that at these points the phase of the signal (pulses) is nearly opposite to that of the carrier (continuous wave). If the wave as shown in this Fig. 4 (a) were rectified incidentally to the receiver operation the result would be a negative pulse at each of these two points. In deference to a practical situation where we "gate" only the intervals in which the pulses occur, the result would be somewhat different and as shown in Fig. 4 (b). This gating operation is well known in the art as a means for occluding particular pulses. For instance, in conventional radar practice "gating" can be used to eliminate all reference to targets "seen" by the radar antenna except that one, the range of which is to be indicated. Similarly in the present considered system the principle may be used to enable concentration on a particular range in order to measure the relative velocity of a target at that range. Its operation is in the nature of a suppression of all energy arriving outside a given recurrent interval of time. See description of the Fig. 5 circuit for treatment of "gating" as it might analogously be applied to the Fig. 3 circuit.

The Doppler frequency, that is, the beat frequency, for the system of Fig. 3 (and analogously for the system of Fig. 1) may be indicated conventionally by counting a secondary beat, that is, a beat between the Doppler beat frequency wave and the wave from a separate source when combined with the Doppler beat frequency wave. Practically this would probably be done by using as this combining wave a wave from the pulse source itself so that the secondary beat can measure the difference in frequency between the Doppler beat and the pulse rate. If sufficiently different from the pulse rate this secondary beat may be read on a vibratory or tuned type of frequency indicator and this would be a practicable method although more inaccurate and less sensitive than that to be next described.

It is to be observed from Fig. 4 that because the pulse rate differs from the Doppler beat frequency, the rectified pulses necessarily differ from each other in amplitude, as occurring in different parts of the beat frequency cycle. However, this pulse rate can easily be changed without effect on the operation of the Doppler principle. This has the desirable effect, if the pulse rate (frequency) is made to equal the Doppler beat frequency, of, by itself, providing an easily indicated measure of this frequency and therefore of the relative velocity. All that is necessary is to vary the pulse frequency while observing the rectified envelope (b) of Fig. 4 in a cathode ray oscillograph. As the pulse rate approaches the Doppler rate that rectified pulse shown in Fig. 4 (b) will rise and fall more and more slowly until finally it comes to rest at "zero beat." When this "zero beat" condition is reached and the pulse amplitude remains uniform, the pulse frequency is equal to the Doppler frequency. This provides an extremely accurate and sensitive measurement of the latter while involving the greatest simplicity of the circuit as a whole because of the duplicate use of circuit elements.

Consistently with the next above simple method of indicating the Doppler beat frequency, it is even possible, by use of technique which is old in the art, to insure automatically that the pulse rate is controlled in synchronism with said Doppler beat frequency for any particular pulse reflection that is "gated." For instance, by using two outputs, one said beat frequency wave and the other said pulse frequency wave, with the phase of one said wave reverse with respect to the other, crossed slopes can be provided for automatically controlling the pulse rate oscillator frequency. This crossed slope principle is illustrated in, for example, Bown 1,490,958, April 22, 1924. Fig. 5, presently to be considered, illustrates a system of the invention which contemplates the employment of this means for measuring the Doppler beat frequency by the pulse frequency itself, although not embodying the automatic feature last described.

It has been noted above that although the continuous wave-continuous wave system would illustrate the advantages of the utilization of the Doppler principle the continuous wave-pulse wave combination of the invention is preferable because of the particular advantages inherent in the use of pulses in the ether as compared with continuous waves. The greatest advantage is that of being able to "see" any one of many objects, although it has, as well, the practical advantage that it enables the same system to be used in range finding (radar) as well as for relative velocity measurement. This suggests a consideration of the pulse-wave pulse-wave method in comparison with the continuous wave-pulse wave method.

If the reflected pulse is combined with a local pulse the beat effects are quite good as Doppler rate indications. Such a method could be used with a vibration or tuned indicator if the pulse rates are sufficiently higher than the Doppler rates. It can also be used with the pulse rate-Doppler rate equilization method. The main disadvantage may be that the pulse-wave pulse-wave method requires more accurate adjustment and is less flexible in some cases such as when observing the movement of a number of objects. With the continuous wave-pulse wave arrangement the pulse rate may be adjusted to some value that would show all the reflected pulses from stationary ground objects to rise and fall in intensity together. Any objects moving on the ground would show a different beat rate and therefore stand out conspicuously. The pulse-wave pulse-wave method permits observations on only one object at a time. This may be advantageous at times. In the continuous wave-pulse wave case we would "gate" single reflections to look at one alone.

Fig. 5 may be thought of partly as an elaboration of the Fig. 3 system to disclose the preferred means, above explained in general, for measuring the Doppler beat frequency. It also illustrates how the Fig. 3 system may be modified, as in accordance with conventional radar practice, to use a single antenna for transmitting and receiving. Similar elements are designated by the same reference numerals. The description will largely pertain to the added elements.

Element 9 is a blocking tube that might well have been shown in the systems of Figs. 1 and 3 although particularly applicable in the generic class to which Figs. 3 and 5 belong because of the presence therein of a prime wave source which, in the operation of the organization as a whole, is required to generate a wave which is very stable as to frequency. The blocking tube, which may also amplify, prevents reaction on said prime source 6 from subsequent circuit elements.

The transmitting and receiving antennas 2 and 4 of Fig. 3 are replaced in Fig. 5 by the single antenna 10. This is made possible largely because of the TR box 11. This is an element familiar in the radar art. Its purpose is to permit the flow of outgoing energy without interfering with the receiving circuits attached to the same antenna, while permitting received energy to flow to the receiving circuit, such as receiver 5.

The continuous wave required at receiver 5 is transmitted directly thereto from source 6, as in Fig. 3, as shown by the connecting line. The adjustable gate 14, shown in block in this line provides, as in accordance with conventional radar practice, a means, including a time delay circuit, controllable by the pulse source, for gating the receiver, so that any group of reflected pulses may be selected. This is therefore a means for concentrating the operation of the method on a given relatively movable object, to the exclusion of other objects. Although as here shown the gating path between the pulse source and the receiver in part includes the path for transmitting the continuous wave to the receiver, and therefore so as to gate the continuous waves as well as the pulses, this is quite permissible. It at least insures that continuous waves are present only when required. Alternatively, the path for the continuous waves could be individual to said waves and therefore not subject to effect from the gating operation. Variable resistance 12 in this continuous wave path insures that the correct amount of continuous waves is present at the receiver.

The continuous wave and pulses are combined in receiver 5 as in the Fig. 3 system and impressed on one pair of the deflector plates of cathode ray oscillograph 13. As in the usual practice, the wave so impressed would not appear on the oscillograph screen as the envelope wave, Fig. 4 (b), as desired, without a sweep circuit means to provide a horizontal axis. This could be by means of an independent sweep circuit source but here, for convenience and economy of plant and because the pulse frequency would make it permissible the pulse source itself is used for that purpose. For practical purposes, the sweep circuit, that is circuit 15 could be a conventional multivibrator coerced by the output wave from the pulse source 8.

In the operation of the Doppler beat frequency measuring means of this figure, the pulse frequency is varied while observing the trace on the oscillograph. When the amplitudes of the rectified pulses, as shown in Fig. 4 (b), are of equal amplitude and stable in character, the pulse frequency is known to exactly equal the Doppler beat frequency. It can be indicated by obvious means since the pulse source is assumed to be calibrated as to frequency. As applied to the equation above given, it provides a direct and proportional measure of the relative velocity in question.

It should be pointed out that the extremely simple representation indicated on the oscilloscope of Fig. 5, and as assumed in Fig. 4, differs greatly in degree from practical experience. The simplest practical range scope would show many reflections from objects of different distances in the direction toward which the radar antenna is pointed. If we were to "gate" the continuous wave, as by the means 14 of Fig. 5, with respect to a given object, the corresponding single pulse appearing on the scope would rise and fall in amplitude at twice the Doppler beat rate. If gating were omitted, so that all pulses were modulated, all of the indicated pulses (and, of course, several would be indicated) would rise and fall together if the Doppler beat for all said pulses, that is, for all reflecting objects, were the same. The whole picture could be brought to a "zero beat" if the relative movement of all objects were the same. Any object not moving at the same rate as the others relatively through the transmitter, such as a truck moving among other stationary, reflecting, objects, would show up immediately as being identified with a different beat rate.

In conclusion it might be well to point out how extremely sensitive an instrument this Doppler radar, if so thought of, may be. If 10-centimeter waves are here assumed, as was assumed earlier, and if the radar transmitter is assumed to be stationary, an object moving toward the stationary radar at a rate of only five centimeters a second, would produce a beat in the reflected pulse of one cycle a second. No conventional radar can approach such a sensitivity. It is true that for such exceedingly slow movement the pulse rate adjustment principle, as above applied, and requiring the pulse rate to equal the beat frequency, would be rather impracticable. However, such rates of movement could very easily be measured by use of a pulse rate which is much higher, and a stop watch with which to count the beat.

This illustrates how the invention is adapted to accord with a wide choice of circumstances. In the contemplation of the system for use on a plane, or on the ground to observe planes, or for any case where movements are measured in at least tens of miles an hour, the type of observation indicated would be such that observations of feet per second are of little practical use. Of course, the converse would be true. As in the measurement of linear dimensions, the method is selected to fit the situation. We would not use an interferometer or a micrometer to measure miles, nor would we use a hundred foot steel tape to measure thousandths of an inch. For minute rates of change the Doppler radar would be used, preferably, with a stop watch. For more rapid rates of change, a vibration meter would be practicable. For very rapid rates either the pulse rate adjustment method specifically described in this application, or a tuned meter indicator, would be best. Where otherwise practicable, probably the pulse rate adjustment method would be capable of doing a more accurate job with less equipment on the basis of present day technique. There might well be occasions, depending on the precise situation, when the desideratum would be extreme accuracy or sensitivity.

What is claimed is:

1. The method of measuring the velocity of a given wave transmitting and receiving station relatively to a given target, comprising the steps of generating a continuous wave, generating a pulse wave, using said pulse wave to transform the continuous wave to a pulsed continuous wave, transmitting the resultant wave to said target and, after reflection therefrom, back to said station, combining said returned wave with a wave corresponding accurately in frequency to said continuous wave to develop a Doppler beat frequency, and adjusting the pulse frequency to a predetermined frequency relation to said beat frequency to provide a direct measure of the relative velocity in terms of said pulse frequency.

2. The method of measuring the velocity of a given wave transmitting and receiving station relatively to a given target, comprising the steps of generating a continuous wave, generating a pulse wave, using said pulse wave to transform the continuous wave to a pulsed continuous wave, transmitting the resultant wave to said target and, after reflection therefrom, back to said station, combining said returned wave with a wave corresponding accurately in frequency to said continuous wave to develop a Doppler beat frequency, indicating the resultant Doppler beat frequency wave to obtain a visual representation, and adjusting the pulse frequency to equality with said Doppler beat frequency as determined by the form of said visual representation, whereby to determine the relative velocity as the direct measure of said pulse frequency.

3. A radio velocity indicating system comprising in combination, a transmitting and receiving station including a continuous wave source, a pulse wave source adapted to vary the frequency of the pulse wave and provided with a frequency calibration, means for pulsing said continuous wave by the pulses from said pulse wave source, means for radiating the resultant wave, a wave reflecting object having relative motion with respect to said station, means at said station for receiving said reflected wave and combining the same with a wave from said continuous wave source to develop the Doppler beat frequency incident to said relative motion and which is a direct measure of the corresponding relative velocity, and additionally at said station a visual indicating means for the resultant Doppler beat frequency wave, whereby the pulse frequency may be varied to equality with said beat frequency so as to itself determine a direct measure of said relative velocity.

4. A radio velocity indicating system comprising at a transmitting and receiving station, a continuous wave source, a pulse wave source adapted to vary the frequency of its pulse wave and provided with a frequency calibration, means for pulsing said continuous wave by the output from said pulse wave source, a common radio transmitting and receiving antenna, a translation circuit connected to said common antenna and containing a transmit-receive box whereby to permit flow of incoming energy together with a regulated part of the energy from said transmitter, and, coupled to said translating circuit, means for combining waves transmitted from said antenna after reflection from a reflecting object and subsequent reception by said antenna, with a wave transmitted from said continuous wave source so as to develop the Doppler beat frequency incident to the relative motion of said station and the reflecting object, and a visual indicating means for the resultant Doppler beat frequency wave, whereby the pulse frequency may be varied to equality with said beat frequency so as to itself determine a direct measure of said relative velocity.

5. The method of measuring the velocity of a given wave transmitting and receiving station relatively to a given target, comprising the steps of generating a wave, generating a pulse wave, using said pulse wave to transform the first-mentioned wave to a pulsed wave, transmitting the resultant wave to said target and, after reflection therefrom, back to said station, combining said returned wave with a wave corresponding accurately in frequency to said first-mentioned wave to develop a Doppler beat frequency, and adjusting the pulse frequency to a predetermined frequency relation to said beat frequency to provide a direct measure of the relative velocity in terms of said pulse frequency.

RALPH K. POTTER.

REFERENCES CITED

The following references are of record in the file of this patent:

UNITED STATES PATENTS

| Number | Name | Date |
| --- | --- | --- |
| 2,407,000 | Evans | Sept. 3, 1946 |
| 2,408,742 | Eaton | Oct. 8, 1946 |
| 2,422,064 | Anderson | June 10, 1947 |
| 2,423,023 | Hershberger | June 24, 1947 |
| 2,450,945 | Eaton | Oct. 12, 1948 |
| 2,514,924 | Becker | July 11, 1950 |
| 2,520,166 | Page | Aug. 29, 1950 |
| 2,522,367 | Guanella | Sept. 12, 1950 |
| 2,535,274 | Dicke | Dec. 26, 1950 |